April 25, 1961  J. S. YOUNGNER ET AL  2,981,658
LIPID PURIFICATION AND CONCENTRATION OF
VIRUSES AND VACCINES THEREFROM
Filed July 7, 1958

INVENTORS
JULIUS S. YOUNGNER
and HANS NOLL

BY Connolly and Hutz

ATTORNEYS

United States Patent Office 2,981,658
Patented Apr. 25, 1961

2,981,658
LIPID PURIFICATION AND CONCENTRATION OF VIRUSES AND VACCINES THEREFROM

Julius S. Youngner, 5831 Marlboro Ave., and Hans Noll, 131 Highview Ave., both of Pittsburgh, Pa.

Filed July 7, 1958, Ser. No. 746,959

16 Claims. (Cl. 167—78)

This invention relates to methods for the purification of viruses and like infectious agents and particularly to the purification and concentration of viruses and the like by the use of lipid adsorbents. This application is a continuation-in-part of our copending application Serial No. 720,963, filed March 12, 1958, and now abandoned.

There has long been a need for a satisfactory method of purifying and concentrating viruses such as, for example, the viruses of influenza, vaccinia, Newcastle disease, and similar infectious diseases. The purification and concentration of viruses is exemplified by the practices used in purifying and concentrating the viruses of influenza, and we shall specifically describe the process as applied to that particular virus. The viruses of influenza have proven to be particularly troublesome to purify and concentrate and large amounts of vaccine produced by ordinary methods have been of such low potency as to be ineffective. Such low potency vaccines must be discarded with considerable loss of time, labor and money and a resulting increase in the cost of vaccines to the general public.

In the production of the vaccines of influenza it is the general practice to inoculate eggs in batches of about 20,000. The viruses are developed in the allantoic fluids of the infected eggs. After proper incubation time, the eggs are broken and the egg fluids centrifuged through a high speed centrifuge. The viruses are drawn out of the liquid along with considerable amounts of egg protein and the like. The viruses recovered from the centrifuge are then resuspended and checked for virus content. These practices recover only about 50% of the virus originally available so that there is a great loss in the processing. Moreover, these conventionally produced influenza vaccines contain egg protein in sufficient amounts to cause severe toxic and/or allergic reactions in certain people. In such cases the undesirable side effects of the influenza vaccine may outweigh the benefits of any protection which might be obtained.

We have found a method of purifying and concentrating viruses and the like infectious agents other than entero viruses for the production of vaccine and other bacteriological and biological uses that eliminates the problems which have heretofore plagued the commercial production of such materials. Preferably, we concentrate and purify these viruses and the like by the steps of collecting the virus to be purified together with whatever biological contaminants accompany it, bringing the virus into contact with a lipid and separating the lipid from the remaining biological materials whereby the virus is retained in the lipid.

In a preferred practice of our invention as applied to the concentration and purification of the viruses of influenza we pass the infected allantoic fluid removed from eggs and containing influenza virus through a column containing cholesterol until the cholesterol is saturated with the virus. The cholesterol is then removed from the column and used in the production of vaccine.

The process of this invention may be perhaps best understood by reference to the following examples:

Example I

Infected allantoic fluid containing influenza virus (PR8) was passed through a column at a rate of 0.1–0.5 ml. per minute. Using 2 grams of cholesterol in a colum (18 x 17 mm.) it was found that 22,000 hemagglutinating units of influenza virus were required for saturation. This represented 96% of the virus contained in 18 ml. of allantoic fluid (titer: 1280 HA units/ml.) passed through the column. The virus appearing in the effluent was recoverable by passing through a second cholesterol column. Similarly, with allantoic fluids of lower virus content equally high virus concentrations per gram of cholesterol could be obtained by passing correspondingly larger volumes through the column. Protein assays of the original fluids and the effluents showed that less than 10% of the protein was retained in the column. These data indicate a greater than 10-fold increase in the specific activity of virus per milligram protein.

Example II

Commercial polyvalent influenza vaccine in which the viruses had been concentrated 20-fold by Sharples centrifugation and inactivated with formalin was passed through a column identical with that in Example I. The cholesterol removed from the column showed an adsorption of 94% of the virus and only 6% of the original protein in the vaccine. This represents an increase in specific activity of hemagglutinating units per milligram of protein from 2,130 in the original vaccine to more than 29,900 in the cholesterol column.

It was found that influenza virus adsorbed to cholesterol remained active with regard to hemagglutination, infectivity and antigenicity. Thus, when the cholesterol was removed by extraction with ether in the presence of an aqueous phase, an aqueous virus concentrate containing 40% of the original hemagglutinin activity was obtained. Infectivity determinations carried out with cholesterol suspensions from columns with adsorbed virus gave values corresponding to the number of infectious units retained in the column.

Immunization of experimental animals with suspensions of cholesterol to which influenza virus had been adsorbed showed that the cholesterol vaccines produced about 4-fold higher antibody levels than aqueous virus suspensions containing an equal number of virus particles. Furthermore, the elevated antibody titers in animals inoculated with cholesterol vaccines persisted over a longer period of time. This effect was particularly striking with a commercial polyvalent influenza vaccine which, before adsorption to cholesterol, produced a generally poor antibody response. This effect is illustrated in the accompanying drawings, Figures 1 through 4, in which:

A comparison of the levels shown on these drawings in chain line and in solid line shows that the virus adsorbed to cholesterol is far more effective in antibody response than is virus as commercially produced. Adsorption of the virus antigens to cholesterol markedly increased the antibody response. The cholesterol adsorption method is especially useful for the manufacture of potent vaccines from biological fluids of low virus content since it combines effective concentration with the adjuvant effect of the cholesterol. This adjuvant effect is illustrated in Figure 5 of the accompanying drawings forming a part of this application.

Figure 1:
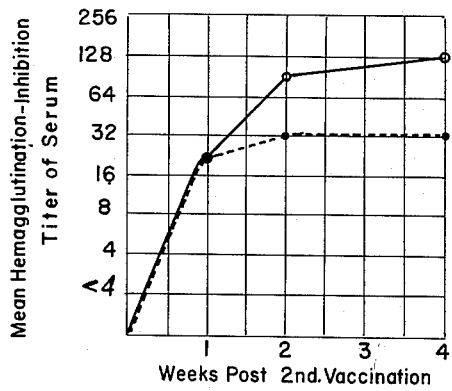
Figure 1 shows the antibody response of chicks infected with two doses of aqueous formalinized polyvalent influenza virus B' in chain line and an equal amount of the same virus adsorbed to cholesterol in the solid lines (1:10 dilution of aqueous vaccine used as antigen)
Figure 2:
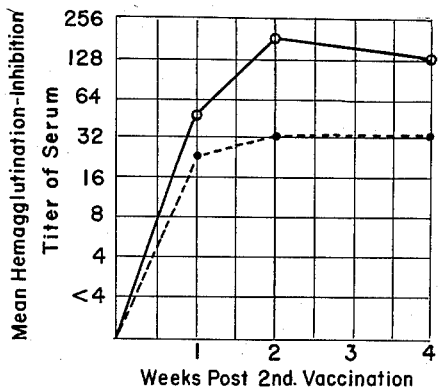
Figure 2 shows the antibody response of chicks infected with two doses of aqueous formalinized polyvalent influenza virus A' in chain line and an equal amount of the same virus adsorbed to cholesterol in the solid lines (1:10 dilution of aqueous vaccine used as antigen)
Figure 3:
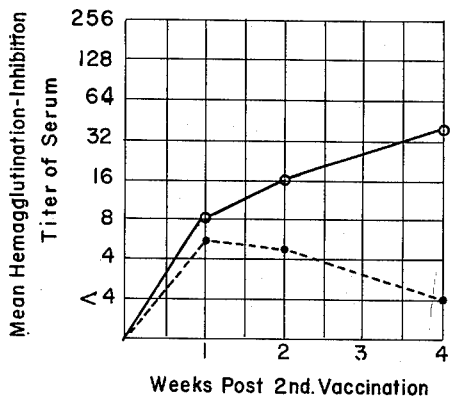
Figure 3 shows the antibody response of chicks infected with two doses of aqueous formalinized polyvalent influenza virus Asian in chain line and an equal amount of the same virus adsorbed to cholesterol in the solid lines (1:10 dilution of aqueous vaccine used as antigen)
Figure 4:
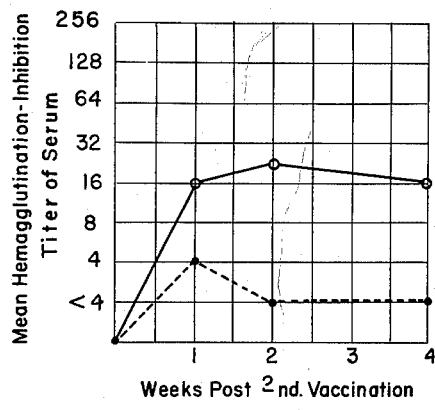
Figure 4 shows the antibody response of chicks infected with two doses of aqueous formalinized polyvalent influenza virus A in chain line and an equal amount of the same virus adsorbed to cholesterol in the solid lines (1:10 dilution of aqueous vaccine used as antigen).
Figure 5:
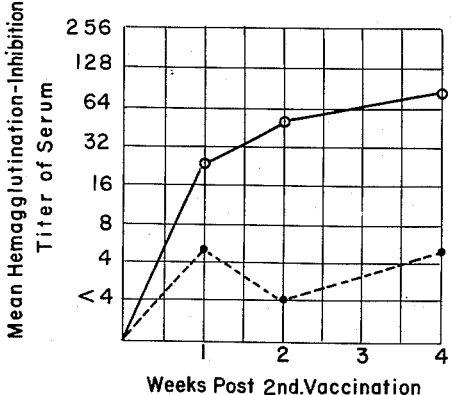

Figure 5 shows the antibody response of chicks injected with two doses of original allantoic fluid (chain line) and a 10-fold concentrated virus in cholesterol suspension (solid line).

The virus used in the particular instance illustrated in Figure 5 was the Michigan strain Asian influenza. A comparison of the curves of Figure 5 shows the marked effectiveness of the present method in the production of high potency vaccines from biological fluids of low virus content.

*Example III*

Crystalline hexadecylamine was ground with phosphate buffered saline (PBS) to a homogeneous paste and suspended in PBS to a concentration of one gram per 10 cc. A series of tubes containing 5 cc. each of infected allantoic fluid (1280 hemagglutination units (HA) per cc.) were added with 5 cc. of PBS containing decreasing amounts of hexadecylamine (HDA). The tubes were shaken and then centrifugated. This resulted in the separation of a clear infranatant aqueous phase and a supernatant lipid layer. The infranatant aqueous layer was then assayed for residual virus.

| HDA Mgm./tube | Total HA Units in aqueous phase | Percent HA units adsorbed to lipid |
|---|---|---|
| 250 | 0 | 100 |
| 100 | 0 | 100 |
| 50 | 300 | 91 |
| 25 | 600 | 82 |
| 10 | 1,200 | 62 |
| none (control) | 3,200 | |

It can be seen from the table that hexadecylamine in a final concentration of only 0.1% adsorbed 62% of the hemagglutination units present. This corresponds to a ratio of 200 HA units of virus adsorbed to 1.0 mg. of hexadecylamine adsorbent.

*Example IV*

Another virus found to adsorb strongly to cholesterol was Herpes-B virus. This virus is carried by many species of monkeys in a latent form and is occasionally transmitted to man. Infections with this virus in man are uniformly fatal.

10 cc. of rabbit kidney tissue culture fluid containing $6.4 \times 10^7$ infectious doses of Herpes-B virus were passed through a two gram column of cholesterol. Assay of effluents and washings showed that only $2.4 \times 10^5$ infectious doses failed to adsorb to cholesterol. This corresponds to an adsorption of 99.7% of virus to cholesterol. Infectivity determinations were carried out in rabbit kidney tissue cultures.

*Example V*

100 cc. of allantoic fluid containing a total of 128,000 hemagglutination units of PR8 influenza virus were passed through two grams of palmitic acid. A total of 18,000 hemagglutination units were recovered in the effluents and washings. This corresponds to an adsorption of 85% of the virus passed through the column. Assays showed that the virus concentration of the last effluents from the column was only 25% of the input concentration indicating that the column was still not saturated.

The two grams of palmitic acid containing 110,000 hemagglutination units of adsorbed influenza virus were suspended to a volume of 20 cc. PBS. Chicks were immunized with two doses of suspension of 0.5 ml. each spaced two weeks apart. Antibody determinations were made 12 days after the second injection. Groups of four chicks each received a total of 100, 25, 6.25, and 1.6 mg. of palmitic acid respectively, or 5,500, 1,375, 363 and 90 hemagglutination units per animal. All groups of chicks produced mean antibody titers of greater than 1:300 when tested by the hemagglutination inhibition test. This indicates that as little as 90 hemagglutination units of virus adsorbed to palmitic acid was capable of producing a significant antibody response. It follows from this that even smaller amounts of virus adsorbed to palmitic acid may produce efficient immunizations.

This experiment demonstrates that palmitic acid is a particularly suitable adsorbent for the preparation of purified viral vaccines because it combines high adsorption efficiency with adjuvant effect so that effective immunization can be achieved by the injection of minimal amounts of lipid.

Subcutaneous or intramuscular injections of up to 20 mg. of either cholesterol or palmitic acid into guinea pigs did not produce any macroscopical pathologcial lesions nor any ill effects over a period of 4 weeks.

Similar results have been obtained with the following viruses were passed through a cholesterol column: vaccinia, Newcastle disease, bacteriophage ($T_1$ and $T_2$), influenza (strains A, Asian, A' and B'). In every case the concentrated virus appeared more potent in producing higher antibody levels than aqueous virus suspensions and remained active with regard to hemagglutination, infectivity and antigenicity.

We have produced similar results by using a batch adsorption process in which the lipid was put into suspension in virus containing solution, e.g., the allantoic fluid from eggs, and then separated from the solution by any well known method, such as filtration.

We have repeated the foregoing examples using other lipids with equally good results. The following table sets out by way of example other lipids and the percent recoveries obtained.

| Lipid | Virus | Percent Recovery | Method | Origin |
|---|---|---|---|---|
| cholesterol | influenza Formosa. | 80–100 | column | allantoic fluid. |
| Do | do | 80–100 | batch | Do. |
| Do | do | 80–100 | column | monkey kidney. |
| Do | do | 80–100 | batch | Do. |
| Do | influenza 301. | 80–100 | do | allantoic fluid. |
| Do | do | 80–100 | column | Do. |
| Do | do | 80–100 | batch | monkey kidney. |
| Do | do | 80–100 | column | Do. |
| Do | influenza GL 1739. | 50 | batch | allantoic fluid. |
| Do | do | 50 | column | Do. |
| Do | do | 50 | batch | monkey kidney. |
| Do | do | 50 | column | Do. |
| ergosterol | influenza PR 8. | 90–100 | batch | allantoic fluid. |
| Do | do | 90–100 | column | Do. |
| beta-sitosterol | do | 80–100 | batch | Do. |
| Do | do | 80–100 | column | Do. |
| hexadecanol | do | 80–100 | batch | Do. |
| Do | do | 80–100 | column | Do. |
| octadecanol | do | 80–100 | batch | Do. |
| Do | do | 80–100 | column | Do. |
| palmitic acid | do | 90–100 | batch | Do. |
| Do | do | 90–100 | column | Do. |
| Do | influenza Formosa. | 90–100 | batch | Do. |
| Do | do | 90–100 | column | Do. |
| stearic acid | influenza PR 8. | 90–100 | batch | Do. |
| Do | do | 90–100 | column | Do. |
| hexadecylamine | do | 100 | batch | Do. |
| Do | do | 100 | column | Do. |
| Do | influenza GL 1739. | 100 | batch | Do. |
| Do | do | 100 | column | Do. |
| stearamide | influenza PR 8. | 90–100 | batch | Do. |
| Do | do | 90–100 | column | Do. |

The foregoing table shows that a variety of lipids can be used for the adsorption, concentration and purification of viruses and the like other than entero viruses. A common characteristic of these lipids is the presence of a polar hydrophilic group, e.g., OH, $NH_2$, COOH, $CONH_2$ which makes possible their dispersion in water. We have found that it is necessary that the lipid and the culture medium be readily dispersible one in the other. Lipids which cannot be dispersed in the culture medium are not effective for this invention. We have found, however, that the use of well known mechanical and chemical dispersion methods will permit the use of these normally non-dispersible lipids. For example, the addition of wetting agents to lipids non-dispersible in water will make them effective. We have taken tri-stearin which is non-dispersible in water and normally ineffective for our process and by the addition of one of the wetting agents, glycerol or Triton WR 1339, have been successful in causing the tri-stearin to adsorb influenza virus PR 8 from allantoic fluid.

We have found that the vaccines produced according to our process have a higher potency and afford longer periods to protection. This is apparently due to the adjuvant effect of the lipid. Moreover, tests have indicated that the viruses purified and concentrated according to our process are more stable upon storage and have a longer useful life.

While we have illustrated and described certain preferred practices of our invention, it will be understood that the invention may be otherwise embodied within the scope of the following claims.

We claim:

1. In a method for the purification and concentration of viruses other than entero viruses, the steps of bringing the impure virus in an aqueous medium into contact with a water-insoluble lipid having a polar hydrophilic group and dispersible in said medium, and separating the lipid and adsorbed virus thereon from the remaining biological contaminants.

2. In a method for the purification and concentration of viruses other than entero viruses, the steps of bringing the impure virus in an aqueous medium into contact with cholesterol and separating the cholesterol and adsorbed virus thereon from the remaining biological contaminants.

3. In a method for the purification and concentration of viruses other than entero viruses from biological solutions, the steps of adsorbing the virus to be purified onto a water-insoluble lipid having a polar hydrophilic group and dispersible in said solution, and separating the lipid together with the virus from the remaining biological solution.

4. In a method for the purification and concentration of viruses other than entero viruses from plasma and serum, the steps of adsorbing the virus to be purified onto cholesterol and separating the cholesterol together with the virus from the remaining biological solution.

5. In a method for the purification and concentration of viruses other than entero viruses, the steps of passing the impure virus in a biological solution through a column containing at least one water-insoluble lipid having a polar hydrophilic group and dispersible in said solution, continuing to pass the virus through said lipid until a desired level of virus concentration is found in the lipid and removing the lipid together with the virus from the column.

6. In a method for the purification and concentration of viruses other than entero viruses, the steps of passing the impure virus in a biological solution through a column containing cholesterol, continuing to pass the virus through said lipid until a desired level of virus concentration is found in the cholesterol and removing the cholesterol together with the virus from the column.

7. In a method for the purification and concentration of viruses other than entero viruses, the steps of collecting the virus together with biological contaminants thereof in a suspending vehicle, bringing the virus into contact with a lipid selected from the group consisting of cholesterol, ergosterol, beta-sitosterol, hexadecanol, octadecanol, palmitic acid, stearic acid, hexadecylamine and stearamide, and separating the lipid and adsorbed virus thereon from the remaining biological contaminants and vehicle.

8. In a method for the purification and concentration of viruses other than entero viruses from plasma and serum, the steps of adsorbing the virus to be purified onto a lipid selected from the group consisting of cholesterol, ergosterol, beta-sitosterol, hexadecanol, octadecanol, palmitic acid, stearic acid, hexaldecylamine and stearamide, and separating the lipid together with the virus from the remaining biological solution.

9. In a method for the purification and concentration of viruses other than entero viruses from biological solutions, the steps of adsorbing the virus to be purified onto a water-insoluble lipid that is normally non-dispersible in said solution, in the presence of a wetting agent, and separating the lipid together with the virus from the remaining biological solution.

10. A virus vaccine comprising an aqueous suspension of a virus other than an entero virus irreversibly adsorbed onto a water-insoluble lipid.

11. A virus vaccine comprising an aqueous suspension of a virus other than an entero virus irreversibly adsorbed onto a lipid selected from the group consisting of cholesterol, ergosterol, beta-sitosterol, hexadecylamine, hexadecanol, octadecanol, palmitic acid, stearic acid and stearamide.

12. A virus vaccine comprising an aqueous suspension of influenza virus irreversibly adsorbed onto a water-insoluble lipid.

13. A virus vaccine comprising an aqueous suspension of Herpes-B virus irreversibly adsorbed onto a water-insoluble lipid.

14. In a method for the purification and concentration of viruses other than entero viruses from allantoic fluid, the steps of bringing the impure virus in said fluid into contact with a water-insoluble lipid having a polar hydrophilic group and dispersible in said fluid, and separating the lipid and adsorbed virus thereon from the remaining biological contaminants.

15. In a method for the purification and concentration of viruses other than entero viruses from tissue culture fluid, the steps of bringing the impure virus in said fluid into contact with a water-insoluble lipid having a polar hydrophilic group and dispersible in said fluid, and separating the lipid and adsorbed virus thereon from the remaining biological contaminants.

16. In a method for the purification and concentration of viruses other than entero viruses, the steps of bringing the impure virus in an aqueous medium into contact with hexadecylamine and separating the hexadecylamine and adsorbed virus thereon from the remaining biological contaminants.

References Cited in the file of this patent

UNITED STATES PATENTS 2,057,623    Beard _____ Oct. 13, 1936

FOREIGN PATENTS 506,095    Great Britain _____ May 23, 1939

OTHER REFERENCES

PSEBM, vol. 70, February 1950, p. 171.
Toomey: Chem. Abs., vol. 33, 1938, p. 67322.
Freund: JAMA, 130:12, March 23, 1946, pp. 789–90.
Kabat: Exptl. Immunochem., 1st ed., 1948, pp. 17–19, Chas. Thomas, Publ., Springfield, Ill.